United States Patent [19]
Tickle

[11] 3,791,491
[45] Feb. 12, 1974

[54] RAILWAY BRAKES
[75] Inventor: Colin John Frederick Tickle, Tyseley, England
[73] Assignee: Girling Limited, Birmingham, England
[22] Filed: July 14, 1972
[21] Appl. No.: 271,663

[30] Foreign Application Priority Data
July 16, 1971 Great Britain.................. 33,511/71

[52] U.S. Cl..................... 188/70 R, 188/33, 188/59
[51] Int. Cl........................................... B61h 11/14
[58] Field of Search...... 188/33, 46, 59, 70 B, 70 R, 188/74, 107

[56] References Cited
UNITED STATES PATENTS
| | | | |
|---|---|---|---|
| 420,815 | 2/1890 | Martin | 188/70 R |
| 2,359,788 | 10/1944 | Pierce | 188/33 |
| 2,359,805 | 10/1944 | Tack | 188/33 UX |
| 3,056,471 | 10/1962 | Butler | 188/33 |

*Primary Examiner*—Duane A. Reger
*Attorney, Agent, or Firm*—Samuel Scrivener, Jr. et al.

[57] ABSTRACT

A railway vehicle brake arrangement comprises a disc brake and a tread brake, both associated with one and the same wheel and axle set, and a power actuator. Tee disc brake has a pair of caliper levers carrying respective brake shoes, and the actuator is operative to actuate the caliper levers to apply the brakes shoes. The actuator is mechanically coupled indirectly to one of the caliper levers through an equalizing lever which forms part of the transmission to the tread brake.

7 Claims, 3 Drawing Figures

PATENTED FEB 12 1974  3,791,491

RAILWAY BRAKES

This invention relates to railway vehicle brakes, and is particularly, but not exclusively, applicable to brakes for motor bogies of railway vehicles.

In such a bogie, an electric motor or gear case is mounted co-axially with the axle, with the result that there is usually insufficient space inboard of the wheel to mount a brake disc on the axle, but if the brakes act only to the wheel tread, the latter tends to overheat locally due to the concentration of braking effort on a relatively small area of the surface of the wheel. It is known to provide a brake arrangement in which the heat input per unit of braking surface area of the wheel is reduced, by providing both a disc-brake and a tread brake on the same wheel, and the present invention provides a new and improved brake arrangement of this general character.

In accordance with the invention there is provided a railway vehicle brake arrangement comprising a disc brake having a pair of caliper levers carrying respective brake shoes, and a tread brake, both associated in use with one and the same wheel and axle set, and a single power actuator operative to actuate the caliper levers to apply the disc brake shoes, one of the caliper levers being mechanically coupled indirectly to the actuator through an equilizing lever which forms part of the transmission to the tread brake.

The braking effort is thus distributed between the two brakes.

Three embodiments of a railway brake arrangement in accordance with the invention will now be described, by way of example, with reference to the accompanying drawings wherein.

Figure 1:
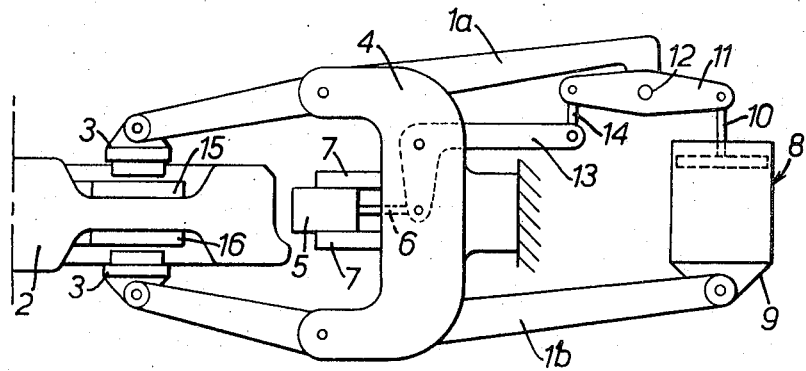
FIG. 1 is a diagrammatic view of one embodiment of the invention.
Figure 2:
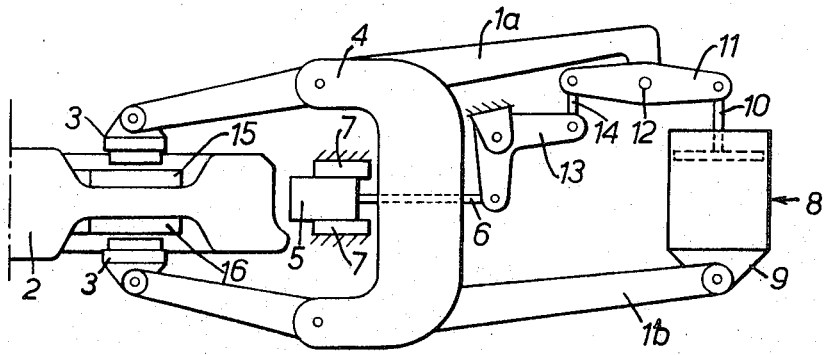
FIG. 2 is a diagrammatic view of a second embodiment of the invention.
Figure 3:
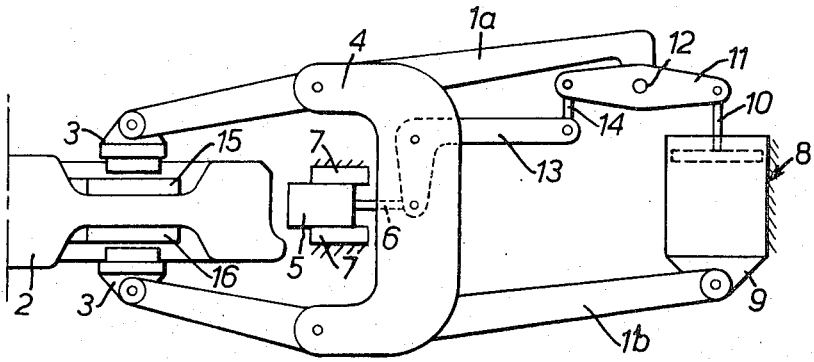
FIG. 3 is a diagrammatic view of a third embodiment of the invention.

In each embodiment, the arrangement comprises a disc brake having a pair of caliper levers 1a, 1b arranged one on either side of a wheel 2 and carrying at their outer ends respective brake shoes 3, a yoke 4 pivotally connecting the two levers 1a, 1b; a tread brake having a brake block 5 connected to a strut 6 and slidable in fixed guides or suspended on swinging links 7 from a fixed support and a power actuator 8 for actuating both the disc and tread brakes. The power actuator housing 9 is pivotally connected to one of the caliper levers 1b and the piston or diaphragm rod 10 of the actuator is pivotally connected to the inner end of an equalizing lever 11 which is pivotally mounted at its centre 12 on the caliper lever 1a. The outer end of the equalizing lever 11 is pivotally connected to one arm of a bell crank lever 13 by a link 14, the other arm of the bell crank lever being pivotally connected to the strut 6 of the tread brake. In the arrangements of FIGS. 1 and 3 the bell crank lever 13 is pivotally mounted at its angle on the yoke 4, whereas in the arrangement of FIG. 2 the lever 13 is mounted on a fixed frame member of the vehicle.

In operation pressure fluid is supplied to the actuator 8 and the diaphragm rod 10 moves to rotate the equalizing lever 11 about its pivotal connection 12 with the lever 1a and the movement is transmitted through the link 14, bell crank lever 13, and strut 6 to the tread brake blocks 5 to apply the brake to the periphery of wheel 2. Reaction at the pivotal connection 12 acts to rotate the lever 1a to apply the associated brake shoe 3 against a disc 15 secured to one side of the wheel, and the movement of the actuator housing 9 effects rotation of the lever 1b to apply the asociated brake shoe 3 against a disc 16 secured to the other side of the wheel. It will be understood that the brake shoes 3 could clamp a disc rotatable with the wheel 2, or the wheel web itself.

It will be appreciated that in the arrangement of FIG. 1 the yoke 4 is rigidly mounted on the frame of the sprung mass of the vehicle so that when the brakes are applied the drag forces on the disc brake shoes 3 are transferred through the caliper levera 1a,b and yoke 4 to the vehicle frame. Thus, no further support for the shoes 3 is required. The tread brake reaction force is also transferred through the yoke to the vehicle frame. In the arrangement of FIG. 2, however, the tread brake links 7 are rigidly mounted on the vehicle frame, the bell crank lever 13 is carried by a support 16 rigidly fixed to the frame, and movement of the disc shoes 3 must be constrained, for example by drag links suspending the shoes 3 from the vehicle frame in known manner. In the arrangement of FIG. 3, the links 7 and power actuator 8 are rigidly mounted on the vehicle frame, and the shoes 3 must be constrained, for example by links as described above.

Many other variations and modifications will, of course, be possible within the scope of the invention. For example, the illustrated power actuator could be replaced by a duplex power actuator, the housing of which may be fixed to the vehicle bogie. The equalizing lever 11 and caliper lever 1b would then be rotated by a pair of pistons of diaphragms, respectively when pressure fluid is supplied between them. In this arrangement the bell crank lever 13 is pivotally mounted on the vehicle bogie and the brake shoes 3 are constrained by rigid links, as previously described. Further, the pivotal connection 12 may be offset from the centre of the equalizing lever 11.

Normally the links of the caliper levers and equalizing lever are so proportional as to provide equal forces at the two shoes 3 and the required porportion of the total braking force at the tread brake block.

In a further alternative arrangement the equalizing lever is connected directly to the tread brake and by means of a link to one arm of the bell crank lever, the other arm of which is coupled to one of the caliper levers.

The tread brake block 5 can be made as a clearing or friction-increasing member which is operable to clear the periphery of the wheel or to deposit thereon friction-increasing material to increase adhesion between the wheel and the rail upon which the wheel is running, in order to reduce the risk of skidding.

I claim:

1. In or for a railway vehicle, a brake arrangement comprising a disc brake having a pair of caliper levers carrying respective brake shoes, and a tread brake, both associated in use with one and the same wheel and axle set of the vehicle; a single power actuator operative to acuate said caliper levers to apply said disc brake shoes and tread brake transmission means including equalizing means coupled to said actuator, means indirectly coupling one of said caliper levers to said actuator through said equalizing means and means directly coupling said other caliper lever to said actuator.

2. In or for a railway vehicle, a brake arrangement comprising a disc brake having a pair of caliper levers carrying respective brake shoes, and a tread brake, both associated in use with one and the same wheel and axle set of the vehicle; a single power actuator operative to actuate said caliper levers to apply said disc brake shoes, and tread brake transmission means including equalizing means coupled to said actuator; wherein said actuator is mechanically coupled indirectly to one of said caliper levers through said equalizing means, said tread brake including a tread brake block, and said transmission means including a bell crank lever connected between said thread brake block and said equalizing means.

3. An arrangement according to claim 2, further comprising a yoke member pivotally connected to said caliper levers, said bell crank lever being pivotally mounted on said yoke member.

4. An arrangement according to claim 3 wherein said yoke member is rigidly mounted in use on a part of the vehicle structure.

5. An arrangement according to claim 2, wherein said bell crank lever is pivotally mounted in use on a part of the vehicle structure.

6. An arrangement according to claim 1 wherein said actuator is mounted in use on a part of the vehicle structure.

7. In or for a railway vehicle, a brake arrangement comprising a disc brake and a tread brake, both associated with one and the same wheel and axle set of said vehicle, said wheel having braking surfaces on opposite sides thereof and at the periphery thereof, a power actuator; and tread brake transmission means including an equalizing lever pivotally connected at its inner end to said power actuator and a bell crank lever one arm of which is connected to the outer end of said equalizing lever; wherein said disc brake comprises a pair of brake shoes for engagement with said braking surfaces on opposite sides of said wheel, a pair of caliper levers which carry at their outer ends said brake shoes, one of said caliper levers being mechanically coupled at its inner end directly to said actuator and the other of said caliper levers being coupled at its inner end to said equalizing lever intermediate its ends, and a yoke member which is pivotally connected to said caliper levers intermediate their ends; and wherein said tread brake comprises a brake block for engaging said braking surface at the periphery of said wheel and mechanically coupled to the other arm of said bell crank lever, whereby operation of said power actuator causes simultaneous actuation of said disc and tread brakes.

* * * * *